Jan. 7, 1936.  C. E. JOHANSSON  2,026,684
DEMONSTRATION APPARATUS
Filed Oct. 18, 1933
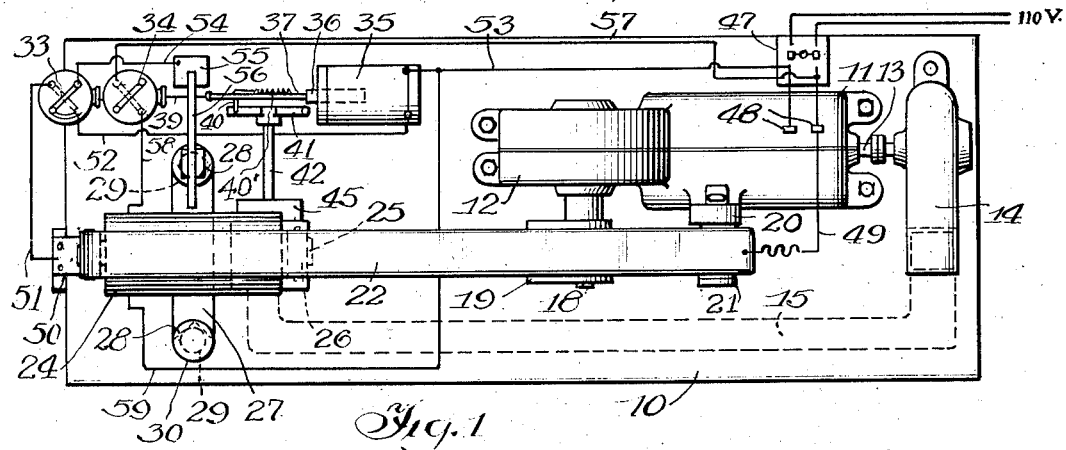
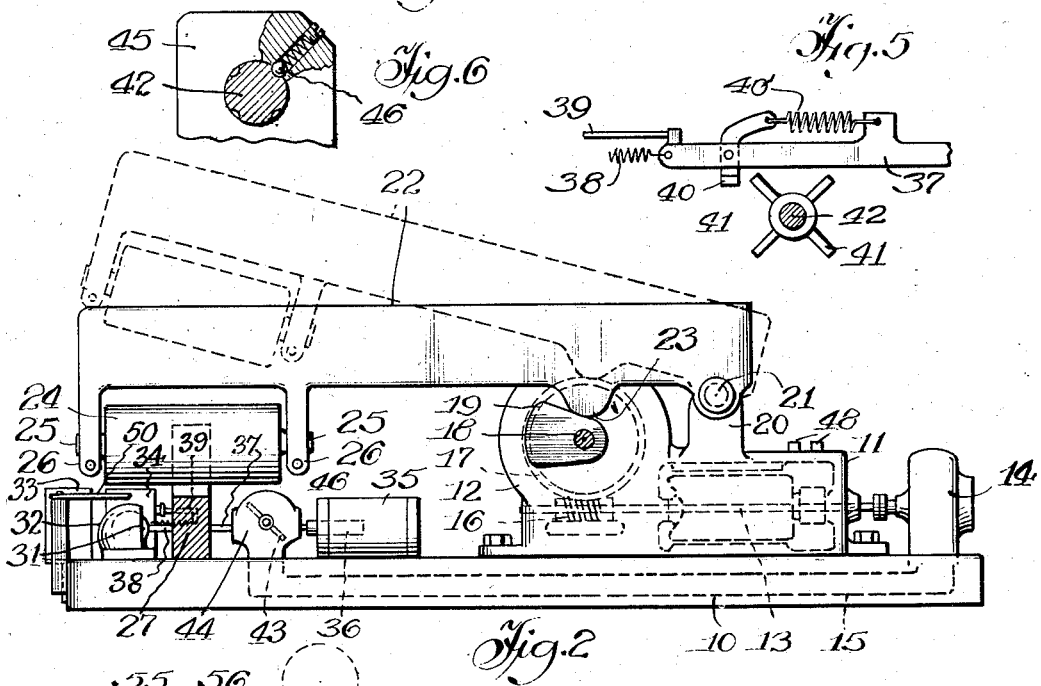
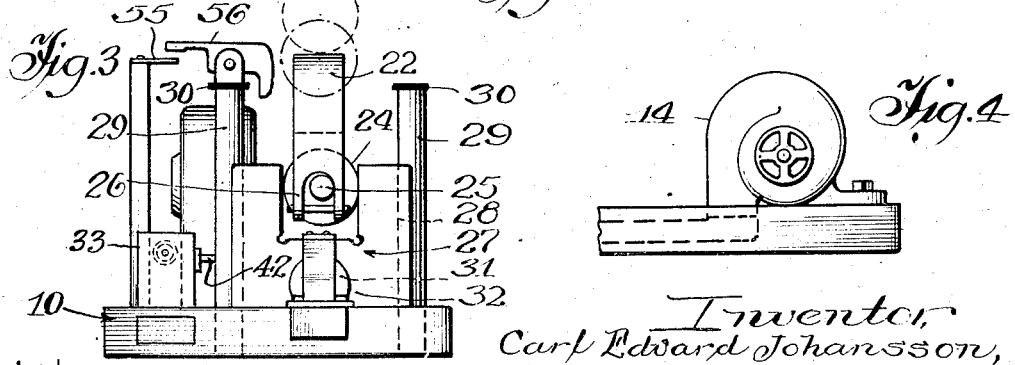
Inventor,
Carl Edward Johansson,
Witness:

Patented Jan. 7, 1936

2,026,684

UNITED STATES PATENT OFFICE 2,026,684

DEMONSTRATION APPARATUS

Carl Edvard Johansson, Detroit, Mich.

Application October 18, 1933, Serial No. 694,077

11 Claims. (Cl. 35—19)

This invention relates to demonstration apparatus intended primarily to indicate the effect of temperature as causing the expansion or contraction of metals, and to call attention to the necessity, when using gauges for very accurate measurements, of making said measurements under uniform temperature conditions or at least to have the gauge and the work at the same temperature.

The embodiment of the invention described herein consists essentially of a pivoted arm which is caused to rock up and down about its pivotal support by an electric motor, one end of said arm carrying a very accurate plug gauge or cylinder which is moved into and out of the opening in a snap gauge, the latter normally resting on the base of the apparatus and being of such size that the plug will not slide into it and out of it without sticking, when the temperature of the two is approximately the same. If the gauge is heated slightly it will expand sufficiently so that the plug will slide into and out of it without sticking.

The term snap gauge used herein refers to a metal plate or block of U shape, with the inside walls parallel and spaced so that the cylinder or other metal block used therewith fits snugly between the same when said plate and said cylinder have the same temperature.

An incandescent lamp is located near the snap gauge, in its normal lowermost position, and is turned off and on at intervals with the result that during certain lifting movements of said plug, the snap gauge will stick to it and will be lifted until it strikes stops which strip it from said plug and cause it to fall back to its initial position. At other times the gauge will be heated by the incandescent lamp and expanded sufficiently so that said gauge will not stick to the plug, but will remain in normal position, resting on the base. The cooling of the gauge to room temperature, after it has been heated by the lamp, is facilitated by a blast of air, directed against it from a blower. The cycle of operations is such that said snap gauge is lifted at intervals by the plug but not necessarily during alternate upward movements of the latter, the lifting movement of said gauge being somewhat irregular as hereinafter explained.

Such apparatus may be used by teachers in trade schools or other institutions of learning, or in shops, or it may be used as an advertising display.

Referring to the drawing:

Fig. 1 is a plan view of apparatus constructed in accordance with the invention;

Fig. 2 is a front elevation thereof partly in section;

Fig. 3 is an end view;

Fig. 4 is a view of the opposite end with certain parts omitted;

Fig. 5 is an enlarged elevation of a pawl and ratchet mechanism; and

Fig. 6 is an enlarged sectional view of a detail.

The apparatus comprises a suitable base plate 10 having mounted thereon the housing 11 of an electric motor and the housing 12 of reduction gearing, the two devices being available commercially as a single unit.

In Fig. 2 the motor parts are indicated in dotted lines, including the motor shaft 13, to one end of which is connected a blower 14, which, as shown in Fig. 4, has a curved discharge pipe communicating with a duct 15 through said base. The other end of said armature shaft drives a worm and gear reduction 16, 17, thereby rotating a shaft 18 at considerably lower speed. Said shaft has a cam 19 mounted on one end thereof.

The motor casting 11 has a lug 20 thereon supporting a hinge pin 21 on which is pivoted the arm 22. Said arm has a depending rounded projection 23 positioned to be engaged by the cam 19 as the shaft rotates and thus swings the free end of said arm up and down.

The plug gauge or cylinder 24 has supporting pins 25 held in the stirrups 26, 26 supported by said arm. When the arm is in horizontal position, said plug fits within the snap gauge 27 and sticks to it. This snap gauge which is made preferably of hardened steel has grooved ends 28, as shown in Fig. 1, whereby said gauge may slide up and down on rods 29, 29, mounted on the base plate and be guided thereby. Said rods have stop plates 30, 30, thereon, made of non-conducting material, which are engaged by said snap gauge when it is drawn upwardly, whereby said snap gauge is stripped from the plug by said stops and drops to its initial position. The dotted line positions in Figs. 2 and 3 indicate approximately the upper position of said plug when the arm is lifted.

In order to heat the gauge and thus expand it slightly, a small incandescent lamp 31 and its reflector 32, are mounted on the base. The various circuits hereinafter described are controlled by two switch arms 33, 34, shown somewhat diagrammatically in Fig. 1, the switch structures being of any suitable type, such for example as the pull cord type. These switch arms are moved back and forth together to either of two positions, by means of a solenoid 35, which, when energized draws in its core 36, thus moving a link 37 against the action of the springs in the switches or of a spring 38 attached to said link, and also moving the small rod 39 which throws said two switch arms from the positions shown in Fig. 1 to the opposite or dotted line positions.

The link 37 also operates a pawl and ratchet mechanism of any suitable type, such for example as the pawl 40 mounted on said link and yieldingly held by spring 40', to engage successively the four teeth 41 mounted on the shaft 42, as shown in Fig. 5, and thus rotate said shaft a quarter turn each time the solenoid is energized. The shaft 42 actuates the valve 43 in the air discharging nozzle 44, said nozzle having two discharge openings on opposite sides and connecting with the duct 15 in the base, whereby air from the blower 14 may be discharged either against the gauge 27 or away from the same, depending on the position of the valve 43. The shaft 42 where it passes through a bearing 45 has four circumferential recesses therein into which the spring pressed ball 46 may snap, thus yieldingly holding said shaft againsts accidental rotation.

The main switch 47 is connected to the supply circuit and to the motor terminals 48. A ground conductor 49 is shown connecting one of the motor terminals in Fig. 1 to the moving arm 22, although in practice this ground connnection may be accmplished in various different ways, as for example through the frame of the machine itself.

When said arm is swung downwardly to the position shown in Fig. 2, the plug 24 engages a resilient contact 50 thereby completing the circuit from one of the terminals of the switch, through said arm 22, contact 50, conductor 51 to the left hand one of the two switches. At this point the circuit is open but when the switch arm 33 is in the dotted line position, the circuit is completed by the conductor 52, solenoid 35, conductor 53 to the other terminal of the main switch. When the switch arm 33 is in the full line position shown in Fig. 1, the circuit is through the solenoid 35 and conductor 52 through said switch arm 33 and conductor 54 to a resilient contact 55 shown also in Fig. 3. The circuit at this point is normally open but may be closed momentarily by a pivoted contact member 56 the weight of which normally maintains it in open circuit position, as shown in Fig. 3. When the gauge sticks to the plug and is lifted, said gauge strikes the pivoted contact member 56 and closes the circuit through the same and through the contact 55, thus momentarily closing the circuit to the solenoid 35. The contact between 55 and 56 is momentary as the plug is stripped from the gauge and immediately falls. The energization of said solenoid reverses the positions of the two switch arms 33 and 34, thereby closing the circuit to the lamp at the switch contact arm 34. The circuit of the right hand one of the two switches in Fig. 1, may be traced from the main switch through conductor 57 and the dotted line position of the switch arm 34, conductor 58 to the incandescent lamp and thence through conductors 59 and 53 to the opposite terminal of said main switch.

In order to render the operation clear, a complete cycle will be described. Assuming that the parts are as shown in full lines in Fig. 2 with a stream of air at room temperature blowing on the gauge and the lamp disconnected, the gauge will stick to the plug and when the arm 22 swings upwardly, due to the rotation of the cam 19, said gauge will be lifted and will strike the pivoted contact member 56, thereby momentarily closing the circuit of the solenoid 35, immediately after which the gauge is stripped from the plug by the stops of insulating material 30 (see Fig. 3) and falls to lowermost position. In the meantime, the energization of the solenoid has thrown the two switches from full line to dotted line positions (see Fig. 1) and has directed the stream of air away from the gauge. As soon as the switch arm 34 engages its contacts, the lamp lights and the heat thereof is directed toward the gauge which begins to expand slowly. As the arm 22 descends, the plug 24 enters the gauge to a greater or less extent, depending on the temperature thereof and if the gauge has expanded sufficiently to permit the plug to slide down in it to the point where it strikes the resilient contact 50, the circuit to the solenoid 35 is thereupon closed through the switch arm 33. Thus both switches are restored to initial position, opening the lamp circuit and directing a stream of air onto the gauge to cool the same more quickly. The arm 22 on its upward swing lifts the plug and leaves the gauge behind, and on the succeeding downward swing if the gauge has cooled off enough to grip the plug the gauge will be lifted by said plug on the next upward movement. However, in practice the gauge does not usually cool off quickly enough to be lifted by the plug on its next upward movement but on the contrary the gauge will remain behind and not be picked up by the plug until the next upward movement thereof. The plug, it will be noted rests loosely in its supporting stirrups so that if on its downward movement it does not slide down within the gauge there is sufficient clearance provided by the supporting stirrups to permit the latter to descend lower than the plug.

When the snap gauge and the plug have substantially the same temperature, said plug encounters sufficient friction in entering the opening in said snap gauge to prevent it from sliding in between the parallel walls of its own weight. However, the additional weight of the supporting, pivoted arm is sufficient to force said plug down a certain distance between the jaws or parallel walls. This is possible for the reason that even the hardened steel jaws have a certain amount of elasticity or resiliency to enable them to yield slightly. In this case, where the parts are made very accurately, it is necessary for the jaws to yield only a few millionths of an inch. The friction developed, however, between the wall of the cylinder and the parallel walls of the jaws, is sufficient to lift the snap gauge when the plug itself is raised. When the snap gauge is heated and expanded sufficiently the weight of the plug or cylinder alone is enough to overcome the friction between the two members with the result that said plug slides all the way to the bottom of the opening in the snap gauge whereupon said plug engages the electrical contact 50. The pins 25 and stirrups 26 permit the necessary relative movement between the plug and the supporting arm 22. Under the conditions mentioned, friction between the plug and the snap gauge is not great enough to cause the latter to be lifted.

Whereas, in the preferred embodiment of the invention described above, an incandescent lamp is used as a heating element, said heating element may consist of any suitable resistor, and, if desired, a lamp similar to the one shown may be connected in circuit therewith, preferably in a shunt circuit around said resistor so as to indicate to spectators when the resistance is being heated and when the current is turned off.

Thus the apparatus demonstrates in a striking manner that expansion resulting from the heat supplied by a small incandescent lamp, or other heating element, for a short interval of time, is sufficient to permit the disengagement of a plug and gauge, which otherwise, at normal temperature, would stick together.

I claim:

1. Demonstration apparatus comprising a U shaped metal member, a cylindrical member which normally fits snugly in the same, a support for one of said members, a holder for the other of said members, means for moving said holder toward and away from said support to cause said members to fit together periodically and hence frictionally grip each other when the temperatures of the two are substantially equal, and follow the movement of said holder away from said support, and means operating in timed relation with said holder for heating said U shaped member at intervals, when the two members are disengaged, to expand the same, whereby said members frictionally slide on each other when subsequently engaged but grip each other when the initial relative temperatures are restored.

2. Demonstration apparatus comprising a base, a snap gauge resting thereon, an arm pivoted on said base, means for swinging said arm back and forth, a metal member supported by one end of said arm and of a size to slide into and frictionally engage said snap gauge when said end swings toward said base, an incandescent lamp for heating said gauge during some of the intervals when said arm swings away from said base, said base having a passageway therein and means for supplying air through said passageway and directing it against said gauge to cool it, whereby the contraction of said gauge will cause it to grip said member and be lifted at certain intervals and expansion of said gauge will cause it to release itself at other intervals.

3. In combination, a base, an arm pivoted thereon above the same, a motor for rocking said arm about its pivot, a plug supported by one end of said arms, a U shaped plate resting on said base in such position that said plug may be slid into and out of the same when the two are at approximately the same temperature, a longitudinal passageway in said base terminating near said U shaped plate, a solenoid on said base, an electric switch actuated by said solenoid, an incandescent lamp controlled by said switch and positioned to heat said U shaped plate at intervals, a blower also driven by said motor for delivering air through said passageway, and means controlling said delivery of air at intervals to cool said U shaped plate when said incandescent lamp is out of circuit.

4. In combination, a base plate, a motor driven reduction gear mechanism thereon including a rotatable shaft, a cam thereon, an arm pivoted adjacent the same and engaged thereby whereby one end of said arm may be rocked up and down, guide members on said base, a snap gauge fitting between said guide members to slide up and down thereon, a plug mounted on said arm to fit into said gauge when the two are at substantially the same temperature, and raise the same by friction during the upward movement of said plug, stops for stripping said gauge from said plug during its upward movement, an incandescent lamp supported by said base adjacent said gauge when in its initial position and means controlled by said gauge in its upper position to light said incandescent lamp and thereby develop heat to expand said gauge and prevent it from adhering to said plug on a subsequent downward movement thereof.

5. A device of the class described, a motor driven gear reduction, an arm pivoted thereon, a cam for swinging one end of said arm up and down, a cylindrical metal plug carried by the end of said arm, a snap gauge of a size and so located as to be frictionally engaged by said plug when the latter is lowered to pick up said gauge and when the two are at substantially the same temperatures, means for stripping said gauge from said plug during the upward movement of said arm, a switch actuated by said gauge during its upward movement, an incandescent lamp controlled by said switch for heating said gauge after it is stripped from said plug whereby on a subsequent downward movement of said plug it will slide into and out of said gauge without adhering to the same.

6. Apparatus as in claim 5 with the addition of a valve for directing a stream of air against said gauge when the circuit of said incandescent lamp is open.

7. Demonstration apparatus of the character described, comprising a snap gauge, means for supporting the same, means for holding a member having a curved surface adapted to fit into said gauge at room temperature, and for moving the same into and out of frictional engagement therewith, mechanism for moving said holding means, and means for varying the temperature of one of the two inter-engaging elements to change the dimensions thereof and thus modify said engagement.

8. Demonstration apparatus of the character described, comprising a snap gauge, means for supporting the same, means for holding a member having a curved surface adapted to fit into said gauge at room temperature, and for moving the same into and out of frictional engagement therewith, mechanism for moving said holding means, means for heating one of the engaging elements during the interval when the same are separated, and means for cooling said element during other intervals.

9. Demonstration apparatus comprising a block of material expansible by heat and having a slot therein, a member of a size to fit snugly in said slot, a support by which said member is carried, means for moving said support toward and away from said block to cause said member to enter said slot, means for heating said block during some of the intervals when said member is withdrawn from said slot to cause it to expand, whereby said member will slide in said slot without sticking, and means for cooling said block during other intervals to shrink it whereby said member will stick in said block at such other intervals.

10. Demonstration apparatus comprising a metal block with a slot therein, a metal member of a size to fit snugly in said slot, a support by which said member is carried, means for moving said support toward and away from said block to cause said member to enter said slot, means for heating said block during some of the intervals when said member is withdrawn from said slot to cause it to expand, whereby said member will slide in said slot without sticking and means for cooling said block during other intervals to shrink it, whereby said member will stick in said block at such other intervals, said heating means comprising an incandescent lamp and a switch turned on and off by the movement of said support, and said cooling means comprising a current of air of intermittent flow, also controlled by the movement of said support.

11. Apparatus of the class described comprising a base, a motor thereon, a shaft driven thereby, an arm above said shaft, a pivotal support for said arm, a cam on said shaft to engage one side of said arm and rock the latter, a blower connected to said shaft, a passageway in said base from said blower and terminating in a hood opening in two different directions, a valve in said hood for discharging air from one or the other of said openings, a snap gauge on said base in line with the discharge of air from one of said openings whereby the same may be cooled to room temperature, an incandescent lamp on the opposite side of said snap gauge for heating the same, a metal plug carried by said arm to swing into and out of said snap gauge at room temperature, a circuit in which said clamp is connected, a switch in said circuit, and actuating means for said switch and said valve, operated in timed relation with said swinging movement, to close said circuit and light said lamp and at the same time direct said stream of air away from said snap gauge, and also to open said circuit and extinguish said lamp and simultaneously direct said stream of air against said gauge.

CARL EDVARD JOHANSSON.